Nov. 8, 1938.  M. BERMAN ET AL  2,136,230

MULTIPLE PASSAGE HOSE

Filed Nov. 27, 1936

INVENTORS
Michael Berman
and William Brockner.
by Parker, Brockner & Farmer.
ATTORNEYS Patented Nov. 8, 1938

2,136,230

UNITED STATES PATENT OFFICE 2,136,230

MULTIPLE PASSAGE HOSE

Michael Berman and William Brockner, Buffalo, N. Y., assignors to Hewitt Rubber Corporation, Buffalo, N. Y.

Application November 27, 1936, Serial No. 112,852

2 Claims. (Cl. 138—49)

This invention relates to improvements in multiple passage hose. This application is in part a continuation of our pending application Serial No. 73,457 filed April 9, 1936, now Patent 2,122,335 of June 28, 1938.

In many instances, it is desirable to deliver two or more fluids from different sources to a common delivery point, as for example in the case of oxygen and acetylene gases, hydrogen and oxygen gases, or other gases which may be used for welding or heating, and which are conducted from separate tanks through hose to the point at which combustion takes place. Similarly in fire extinguishing, dilute sulphuric acid and sodium carbonate solutions may be conducted from separate sources through separate hose to a common discharge point. Under such conditions, it is desirable to have two or more parallel lengths of hose joined into a single hose with separate passages for the different fluids. In connection with most of these uses, it is also essential that the hose be of a strong and rugged construction, such for example as a fabric reinforced hose.

One of the objects of this invention is to provide a multiple passage hose provided with a fabric reinforcement and having a single piece of outer covering common to both passages of said hose. Another object is to provide a hose of this kind in which a plurality of lengths of hose are arranged side by side and joined along an edge so that the outer rubber covers of the several hose are integrally connected and so that the inner portions of the hose will be centrally located with reference to the outer covering. Another object is to provide a hose in which a layer of rubber cement is provided to form a connection between the inner tubing and the fabric of the hose. Other objects of the invention will appear from the following description and claims.

Figure 1:
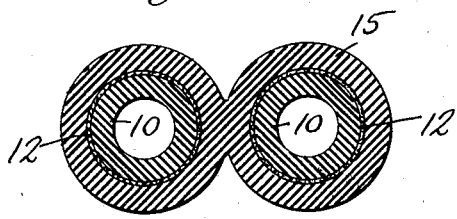
Fig. 1 is a transverse section of a hose embodying this invention.
Figure 2:
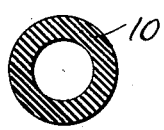
Fig. 2 is a transverse section of the inner tube thereof.
Figure 4:
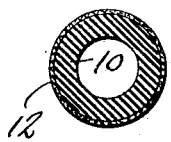
Fig. 4 is a transverse section thereof, on line 4—4, Fig. 3.
Figure 3:
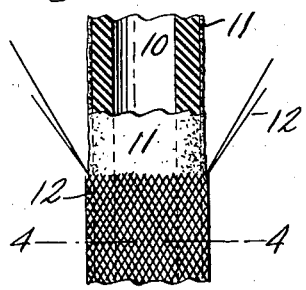
Fig. 3 is a fragmentary elevation, partly in section, showing an inner tube with the cement and fabric applied thereto.
Figure 5:
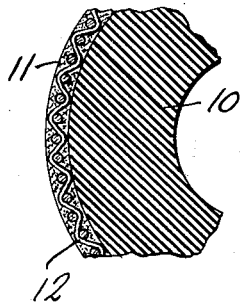
Fig. 5 is a fragmentary transverse section, on an enlarged scale, of the hose tubing, fabric and cement shown in Figs. 3 and 4.
Figure 6:
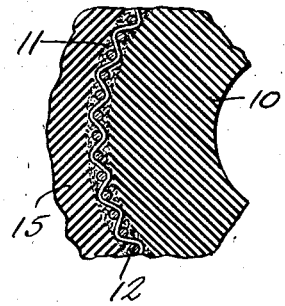
Fig. 6 is a fragmentary transverse section of the finished hose.

Our improved reinforced multiple passage hose includes two or more inner tubes 10 arranged side by side in spaced relation to each other. Each length of tubing 10 may, if desired, be covered on its exterior surface with a layer of rubber cement 11 and a layer of fabric reinforcing 12 is applied, in any suitable manner, either by wrapping the tubing with canvas or by braiding a cord reinforcement about the tubing. 15 represents the outer layer or covering of the hose which is so formed that the covering surrounding one of the inner tubes 10 is formed integral with the covering of an adjacent inner tube 10.

The inner tubing 10 may be produced in any usual or suitable manner, for example, by means of a suitable extruding machine. After this tubing has been extruded, for reasons hereinafter more fully explained, the tubing may be semi-cured by heating in the usual manner, for example, with steam.

In the manufacture of hose of this kind of sufficient strength and durability, it is necessary that the fabric be securely united with the inner tubing 10. Because of the necessity for having the inner tubing relatively stiff, for example, by semi-curing the inner tubing, difficulty is encountered if it is attempted to manufacture this hose in the manner hereinbefore customary for the reason that the relatively stiff or semi-cured rubber tubing does not, during vulcanization under pressure, readily flow into or through the interstices of the fabric. Consequently, for this purpose we may, if desired, apply around the tubing 10 a thin layer of any of the suitable and well known rubber cements. This may be done by passing the tubing through a solution of the liquid rubber cement before the fabric reinforcement is applied. Consequently, this cement bonds itself securely to the semi-vulcanized tubing 10 and also penetrates through the fabric 12 which is applied about the tubing 10. After the fabric has been applied, the tubing is passed through an extruding machine and the outer covering 15 is extruded about the fabric-reinforced inner tubing 10. Through this extruding machine, either a single length of fabric reinforced tubing 10 is passed, or if desired, the extruding die may be formed to receive two or more lengths of fabric reinforced tubing 10 arranged side by side and the outer covering 15 may be extruded as a single piece extending around both of the adjacent lengths of fabric reinforced inner tubing.

Figure 7:
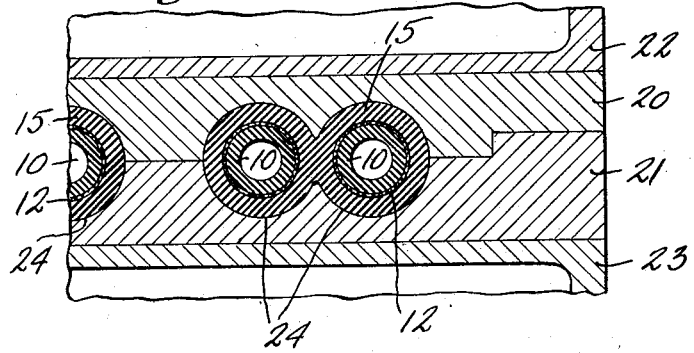
Fig. 7 is a fragmentary transverse section of a mold in which the hose is vulcanized.
Figure 8:
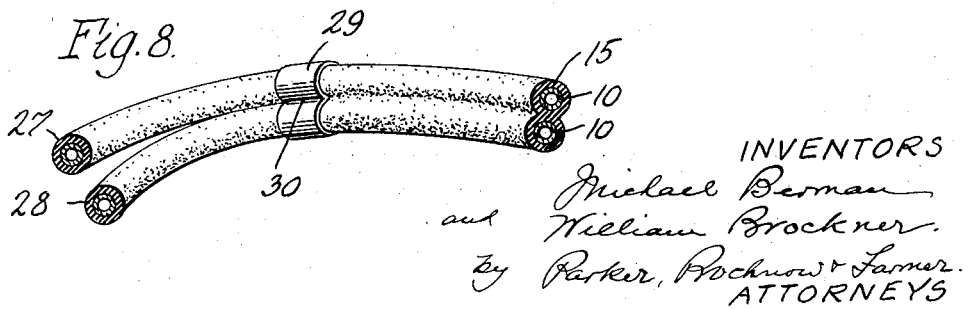
Fig. 8 is a fragmentary perspective view of an end portion of the multiple passage hose embodying this invention.

The vulcanizing of the hose may be done in any suitable or desired manner. As shown in Fig. 7, a vulcanizing press is employed having a pair of mold plates 20 and 21 which are secured in heat conducting relation to steam platens 22 and 23, one of which is movable relatively to the other. The extruded hose is laid in lengths in the grooves or cavities 24 of the platen press as shown in Fig. 7, while the mold plates are separated. It will be noted that the mold plates are provided with connected or communicating grooves or cavities 24 for receiving the adjacent lengths of hose. If these lengths have been extruded separately and are entirely covered about their peripheries with the usual soapstone or talcum, the adjacent portions of the tube lengths of hose are cleaned in any suitable manner to remove the soapstone, so that the covering layers of the two adjacent lengths will adhere to each other and will after vulcanization become integrally connected. The movable platen is then moved toward the fixed platen so that the mold plates 20 and 21 are in contact, as shown in Fig. 8, so that the vulcanization of the hose can proceed. During this vulcanization, the adjacent lengths of hose are filled with air or water under pressure, as is customary in vulcanizing single passage hose, except that when using semi-vulcanized or partly cured inner tubing, we increase the pressure in the tubing from 100 to 150 pounds per square inch. This internal pressure drives portions of the outer surface of the inner tube into the braid or fabric, and with the aid of the cement, the inner tube becomes securely attached to the fabric. During the vulcanization, the heat will cure the outer covering 15 of the hose and complete the curing of the inner tubes 10. The rubber cement, which forms a layer around each inner tube 10, securely bonds the inner tubing to the fabric reinforcement and the outer covering 15.

In the manufacture of single passage hose, the grooves or recesses in the mold plates form continuous walls extending completely around the portions of the hose located within the mold plates, and no difficulty has been experienced in maintaining the inner tubes in central relation to the hose, and consequently, it was not found necessary in connection with the manufacture of single passage hose to semi-vulcanize or otherwise stiffen the inner tubing of such hose. In the manufacture of multiple passage hose, however, the recesses in the mold plates which receive the hose do not extend around the entire periphery of each portion of the hose, and consequently, because of the open or connecting portion between two adjacent grooves or recesses of the mold, the inner tubing is not confined in central locations in the grooves or recesses. This inner tubing, when containing air or water under pressure, tends to become deformed and to enter into the connecting portion of the recesses or grooves of the mold. This deformation weakens the hose for the reason that the outer covering 15 will be of different thicknesses at different portions thereof and the deformation of the inner tubing may also interfere with the free flow of fluids through the hose.

In order to overcome this difficulty and to make it possible to produce multiple passage hose of strength equal to that of corresponding single passage hose, we have formed our multiple passage hose by first semi-vulcanizing the inner tubing 10, which hardens the same so that it will not readily flow toward the opening or connection between two cavities in the mold plates or become deformed. This semi-curing of the inner tubing resulted in difficulty in forming a proper bond between the inner tubing and the fabric reinforcement, since the semi-curing hardens the rubber of the inner tubing to such an extent that it will not flow into or through the interstices of the fabric. This difficulty, however, we have overcome by applying about the semi-cured inner tubing a layer or coating of liquid rubber cement. Consequently, when our improved multiple passage tubing is cured in a vulcanizing press, the hardness of the semi-cured rubber of the inner tubing 10 prevents this tubing from becoming distorted out of circular cross section in the mold cavities when subjected to internal pressure, and the rubber cement forms a very secure bond between the inner tubing, the fabric reinforcement, and the outer covering 15, so that the resulting multiple passage hose has the inner tubing 10 of correct circular form and centrally located in the covering 15. Consequently, the multiple passage hose embodying our invention has a strength or resistance to internal pressure equal to that of single passage tubing of similar size. The multiple passage hose has the further advantages that the tendency of the same to snarl and coil when used is very greatly reduced and the knotting of one length of hose about another is entirely prevented by forming these two lengths into a single piece. When the hose has two passages and is formed of a figure 8 shape, it also tends to lie flat on a floor or supporting surface and there is, consequently, less tendency of the hose to roll or twist.

Hose of the kind described has the advantage that its length is not limited by the length of the vulcanizing press, since the hose can be advanced through the press after each vulcanizing operation, so that a hose of any length can be vulcanized step by step.

In the finished hose, the ends of the hose may, if desired, be formed by having the outer cover separated at the ends to form short lengths of single passage hose, which can be readily connected to the receiving or discharge devices with which the multiple passage hose cooperates. These single passage ends may be formed by simply slitting or cutting the multiple passage hose lengthwise with a knife to the desired distance from an end of the hose, or, if the hose is formed connecting separately extruded single passage hose, by leaving the soapstone between the end portions of the hose so that these end portions will not become vulcanized together.

If desired the separate or single passage ends 27 and 28 of the hose may, at the point at which they are integrally connected, be provided with a band of any suitable form to prevent further separating of the two lengths of hose and to prevent tearing of the cover of the hose at the end of the cut or separation. As illustrated in Fig. 8, this can easily be done by placing about the hose a metal band 29 which initially may be made of elliptical or other suitable form so as to pass easily over the multiple passage hose and the portions of this band at the juncture of the adjacent lengths of hose are pressed inwardly by means of a suitable die or implement to form grooves or depressions 30 at opposite sides thereof, which enter into corresponding grooves or depressions between adjacent lengths of hose. The formation of these depressions in the band 29 also causes this band to contract about the hose so as to be securely held in place thereon. Any other means for reinforcing the hose at the juncture of the separated ends with the integral connection between adjacent lengths may be provided.

While the hose shown includes only two inner tubes or passages, it will be understood that it is not intended to limit this invention to hose having two passages, since obviously three or more lengths of tubing may be integrally connected by means of the outer covering as herein described.

We claim as our invention:

1. A single-piece multiple passage hose comprising a plurality of fabric reinforced rubber tubes arranged side by side and spaced apart, one of said tubes being provided for each passage of said hose, the fabric reinforcement of each tube extending completely around the passage, and a single outer cover of rubber for said plurality of tubes, arranged to form a layer of substantially uniform thickness about each tube and securely bonded to each tube, said cover including an integral connecting part of substantial thickness forming a connection between adjacent lengths of covered tubes and which extends over materially less than one-fourth of the periphery of each of said connected covered tubes, all of said parts of said hose at any transverse section thereof being simultaneously vulcanized together under pressure into a uniform, unitary and resilient body.

2. A single-piece multiple passage hose comprising a plurality of fabric reinforced rubber tubes arranged side by side and spaced apart, one of said tubes being provided for each passage of said hose, the fabric reinforcement of each tube extending completely around the passage, and a single outer cover of rubber for said plurality of tubes, arranged to form a layer of substantially uniform thickness about each tube and securely bonded to each tube, said cover including an integral connecting part of substantial thickness forming a connection between adjacent lengths of covered tubes and which extends over materially less than one-fourth of the periphery of each of said connected covered tubes and forming longitudinal grooves between adjacent covered tubes, the cover at an end of said hose being formed about each tube independently of an adjacent tube without said integral connecting part, whereby the ends of the connected tubes are disconnected from each other at an end of the hose, and a metal band extending about said hose at the juncture of said disconnected ends with the integral connecting part, said band being of an endless piece of metal and having recessed portions bent into said longitudinal grooves to contract said band into tightly gripping engagement with said hose.

MICHAEL BERMAN.
WILLIAM BROCKNER.